United States Patent [19]

Woodbury

[11] 4,273,006
[45] Jun. 16, 1981

[54] AIRCRAFT HORIZONTAL STABILIZER DRIVE

[75] Inventor: James R. Woodbury, Rolling Hills Estates, Calif.

[73] Assignee: McDonnell Douglas Corporation, Long Beach, Calif.

[21] Appl. No.: 946,148

[22] Filed: Sep. 27, 1978

[51] Int. Cl.[3] .......................... F16H 1/44; F16D 9/00; G05G 7/00
[52] U.S. Cl. .................. 74/710.5; 64/28 R; 74/469; 74/713; 244/213
[58] Field of Search .................. 74/710, 710.5, 711, 74/713, 469, 471 R, 479; 244/75 R, 84, 213; 64/28 R

[56] References Cited

U.S. PATENT DOCUMENTS

| | | | |
|---|---|---|---|
| 272,233 | 2/1883 | Gates | 64/28 R |
| 1,156,397 | 10/1915 | Dierdorff | 64/28 R |
| 1,324,857 | 12/1919 | Taylor | 74/710.5 |
| 1,324,859 | 12/1919 | Taylor | 74/710.5 |
| 1,832,254 | 11/1931 | Spanovic | 74/471 R |
| 1,869,326 | 7/1932 | Ludlow | 74/471 R |
| 2,298,316 | 10/1942 | Simmons | 64/28 R |
| 2,439,393 | 4/1948 | Kerr | 74/471 R |
| 2,495,016 | 1/1950 | Mesick | 74/710.5 |
| 2,775,142 | 12/1956 | Brensike et al. | 74/711 |
| 2,778,245 | 1/1957 | Thornton | 64/28 R |
| 3,053,114 | 9/1962 | Singer | 74/710.5 |
| 3,282,130 | 11/1966 | Nishimura | 74/710.5 |
| 3,342,084 | 9/1967 | Randall | 74/711 |
| 3,390,586 | 7/1968 | Colville | 74/469 |
| 3,790,108 | 2/1974 | Bock | 74/469 X |
| 3,886,813 | 6/1975 | Baremor | 74/710.5 |
| 3,906,812 | 9/1975 | Kagata | 74/711 |
| 3,915,032 | 10/1975 | Ottemann | 74/711 |
| 4,043,224 | 8/1977 | Quick | 74/710.5 |

Primary Examiner—Allan D. Herrmann
Attorney, Agent, or Firm—Paul T. Loef; Walter J. Jason; Donald L. Royer

[57] ABSTRACT

A mechanical power transmission apparatus, of the differential gear type, for actuating an airplane control surface requiring two independent actuator inputs to a single control surface. Predetermined, proportionately variable, asymmetric loads between the two actuators are accomodated by a load sensitive brake in conjunction with a fuse link which fails in the event of single actuator or drive means failure. The fuse link is provided by employing a shear pin to attach the pinion gear in the differential to the pinion shaft. The shear pin failure strength in conjunction with the load variable brake determines the allowable differential torque between the two driven bevel gears.

15 Claims, 5 Drawing Figures

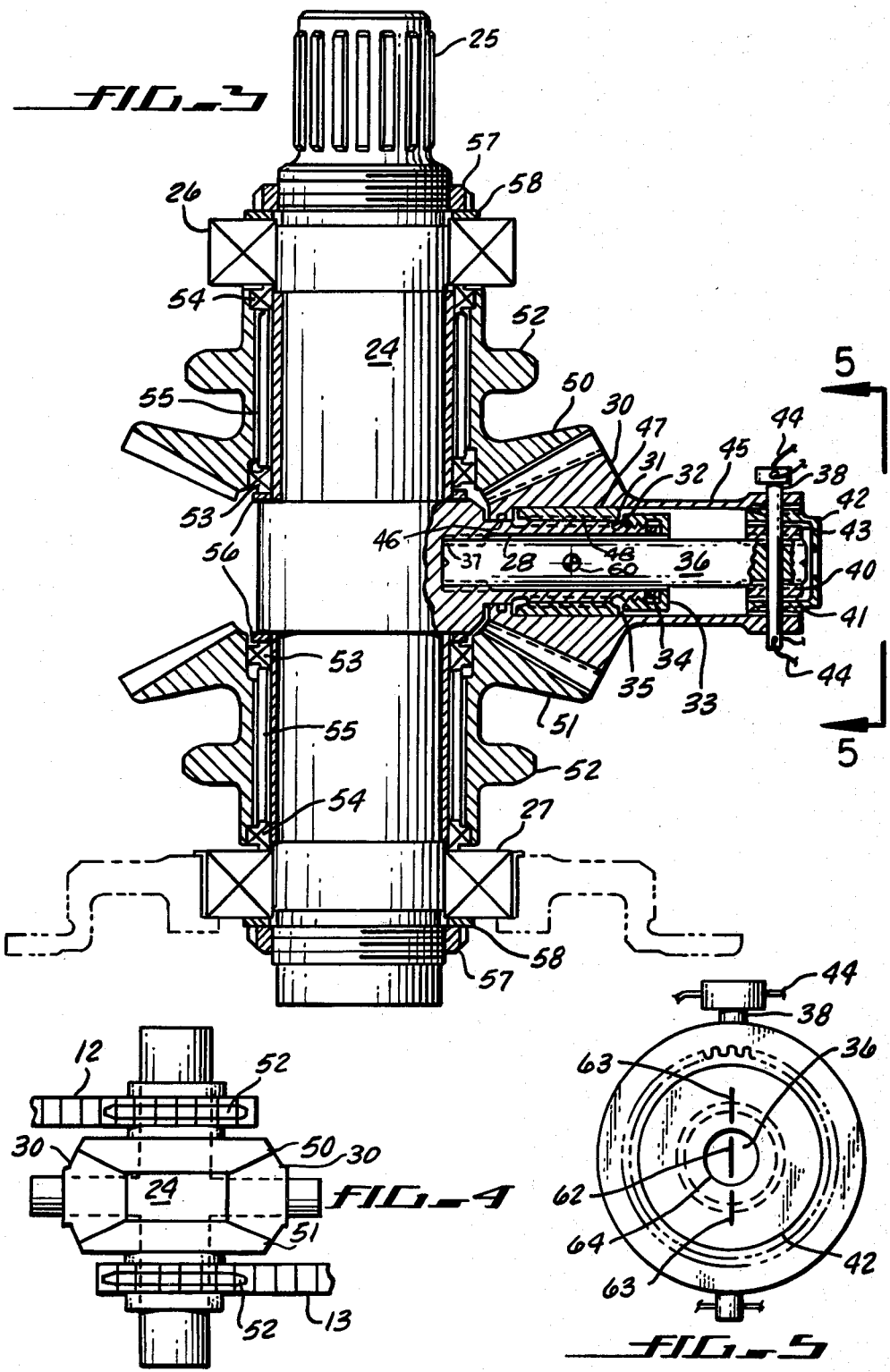

AIRCRAFT HORIZONTAL STABILIZER DRIVE

BACKGROUND OF THE INVENTION

This invention pertains to differential torque limiting devices for mechanical power transmission, and more particularly, to such devices having a single input with two outputs driving two independent actuators which in turn drive a single control surface or device which will tolerate only limited assymmetric loads.

Typically, a single moveable auxiliary airfoil, e.g. a horizontal stabilizer may be actuated by a single actuator although it may employ a torque tube and multiple linkages. However, a single actuator restricts provisions for suitable redundancy in the system in the event of failure of the actuator, its structural support, or its connection to the control surface. Particularly acute is a horizontal stabilizer drive system wherein the entire stabilizer is rotated to provide trim. In the event of an actuator load path failure, the entire stabilizer would be free to rotate about its hinge line and the elevators could not adequately compensate. Dual actuators, either of which will support the stabilizer, but not necessarily drive it alone, provide adequate redundancy. Acme jackscrews, which are inherently no-back devices, meet these requirements. However, employment of dual actuators necessitates synchonization of the actuators. Also the airfoil section rotated must be structurally capable of withstanding a failed or jammed single actuator where one actuator may experience the entire force associated with stall torque of the drive means. Alternately, provisions must be made to avoid this load condition.

Driving the two actuators through a conventional differential gear arrangement wherein the alternate drive outputs are the two driven bevel gears is an alternative well known in the art. In this mode, both output gears are driven only if they are loaded essentially equally. If unequally loaded, the differential pinion will walk about the more heavily loaded first driven bevel gear driving the remaining second driven bevel gear at twice normal speed. The output torque of the two driven bevel gears will be essentially equal. However, since the two actuators must stay in sync with each other, the more lightly loaded advancing screw will jam and become the heavier loaded at which time the second driven gear becomes fixed and the first driven gear rotates. This alternate cycling may continue until both outputs are essentially jammed, at which time the output torque is equally divided. Stall input torque essentially, would be shared equally between the two actuators. Alternately, if the load is lost on one driven bevel gear the differential pinion gear will rotate about the face of the second driven bevel gear (which is still loaded), simply driving the free driven bevel at twice normal speed and applying only the torque to overcome friction.

The obvious problem with this alternative is that the actuator screws may not be maintained in synchronization.

An enhanced embodiment, not hereby conceded to be prior art, is to fasten the differential pinion gear located between the two driven bevel gears to its shaft by a shear pin. This provides a dual (parallel) output mechanical drive with an asymmetrical output load limited to the shear force of the pin holding the pin gear. Once the pinion shears the apparatus is the conventional differential gear drive discussed above.

One undesirable feature with a single shear pin device is that the shear pin must be of adequate size to prevent shearing under maximum load conditions. Consequently at usual (low) operating loads the drive is not sensitive to common faults of a jackscrew actuator—e.g. lack of lubrication or dirt causing high friction and reduced output capability. High load capability from both actuators is required for dive recovery. Since dive recovery is rarely required, it is desirable to have a positive indication of high load capability during usual (low) load operation. Differential load between the two actuator drives at low loads is a good indication of actuator drive capability. The present invention provides a positive indication of actuator capability under usual operation by combining a shear pin and a brake. The shear pin will shear when the actuators have unmatched capability (high differential loading) such as when one actuator is not lubricated or dirty. Opportunity for visual observation of the shear pin is provided for the maintenance crew. With the pin sheared, trimming operation may be continued since the brake provides the differential lock for usual loading conditions.

BRIEF SUMMARY OF THE INVENTION

The present invention is a differential torque limiting device for mechanical power transmission having a single input and dual outputs, particularly adaptable to aircraft control surface actuation. While the invention pertains to any epicyclic gear train of the differential motion type, it will be described with a specific gear type and arrangement for the sake of simplicity and clarity. The input torque is applied to a drive shaft which supports a pair of facing bevel gears free to rotate with respect to the drive shaft. The drive shaft supports a pinion gear on a pinion axle which is attached to, and oriented 90° to the drive shaft axis. The pinion gear is positioned between, engaging, and driving the two bevel gears in a conventional differential gear arrangement. The pinion gear is restrained from rotating on its shaft by a shear pin in combination with a load proportional, self actuating brake between the pinion gear and its axle. The combination governs the allowable differential torque the two drive bevel gears can experience. Hence, rotation of the drive shaft rotates the attached pinion shaft and since the pinion gear is restrained from rotating by the shear pin and brake, it in turn drives the two bevel gears without relative motion between the gears. Should a differential load be experienced between the two bevel gears of sufficient magnitude to fail the shear pin and slip the brake, the pinion will then rotate on its own shaft and will do so with respect to either bevel gear experiencing the higher resisting load. Of course, if one bevel gear has lost its load, that gear may continue to rotate along with the pinion gear in relation to the loaded or jammed bevel gear. The pinion gear, in essence, works as a balance beam, and as long as the loads on the two bevel gears remain the same, the three gears will rotate as a unit, without relative rotation. This result prevails even if the shear pin and brake were removed. However, in practice, loads are not identical. Differential loading is accommodated by the combined torque required to fail the shear pin and slip the brake. As previously noted, the specific gear type described includes only a single pinion gear. However, as common with epicyclic gear trains of the differential motion type, multiple pinion gears each having a shear pin and a load proportional, self-actuating brake between the pinion gear and its axle may be employed. In the multiple pinion application, the differential load between the two driven gears is shared equally between the multiple pinion gears and may be said to share this load in parallel.

An object of the invention is to accommodate differential loads generally as a function of load on a pair of synchronized actuators driven by a single prime mover yet prevent structural damage to the driven surface in the event of a jammed actuator or loss of the driving means to one actuator. The invention enables load sensitive, differential loads by combining a fixed fuse with a load variable fuse. The fixed fuse is designed to accomodate differentials at small loads and the combination at high loads to avoid discovery of malfunctions only at high loads where control authority could be jeopardized.

A further object of the invention is to provide driving force to the actuators after removal of the differential load, e.g. aerodynamic loads, which cannot be accomplished with a shear pin alone.

BRIEF DESCRIPTION OF THE DRAWINGS

FIG. 3 is a section view of the variable fuse differential drive shown in perspective in FIG. 2, taken on section lines 3—3, with the upper structure support removed; and FIG. 4 is a functional drawing showing the fused differential drive in normal load operation showing two pinion gears.

FIG. 5 is an enlarged partial view taken at 5—5 of FIG. 3, showing the indexing means provided to visually reflect the position of the shear pin holding the differential pinion.

DETAILED DESCRIPTION OF THE PREFERRED EMBODIMENT

Figure 1:
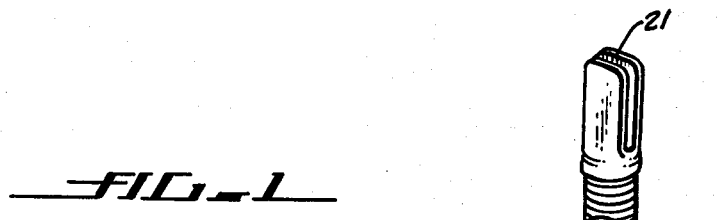
FIG. 1 is a perspective view of an airplane control surface actuation system, including a pair of drive motors, drive fuse, two chains shown in reference, each of which drives a jackscrew, which in turn drives a control surface, not shown.

A representative airplane horizontal stabilizer trim drive actuation system is shown in FIG. 1 without the control surfaces attached to the actuators. The prime movers are shown as hydraulic motors 10, each of which can drive the variable fuse differential drive 11, which in turn, drives the two chain drives 12 and 13 about the idlers 14, 15, and 16 to the left jackscrew 17 and the right jackscrew 18. The two jackscrews 17 and 18 attach to a hinged control surface (not shown) at 20 and 21. Typically, the jackscrew 17 and 18 are provided with a screw stop 22 and a nut stop 23 which engage in the event of a limit valve (not shown) failure to arrest the actuator. Although not shown, a pair of stops 22 and 23 is generally provided top and bottom of each actuator as required. The two jackscrews must drive the control surface sychronously and must be capable of accomodating a single failed drive chain or stalled actuator torque. Also, the system must be capable of accomodating differential loads between the two jackscrews caused by variations in airloads or actuator efficiencies which can be substantial when employing Acme thread jackscrews as shown.

Figure 2:
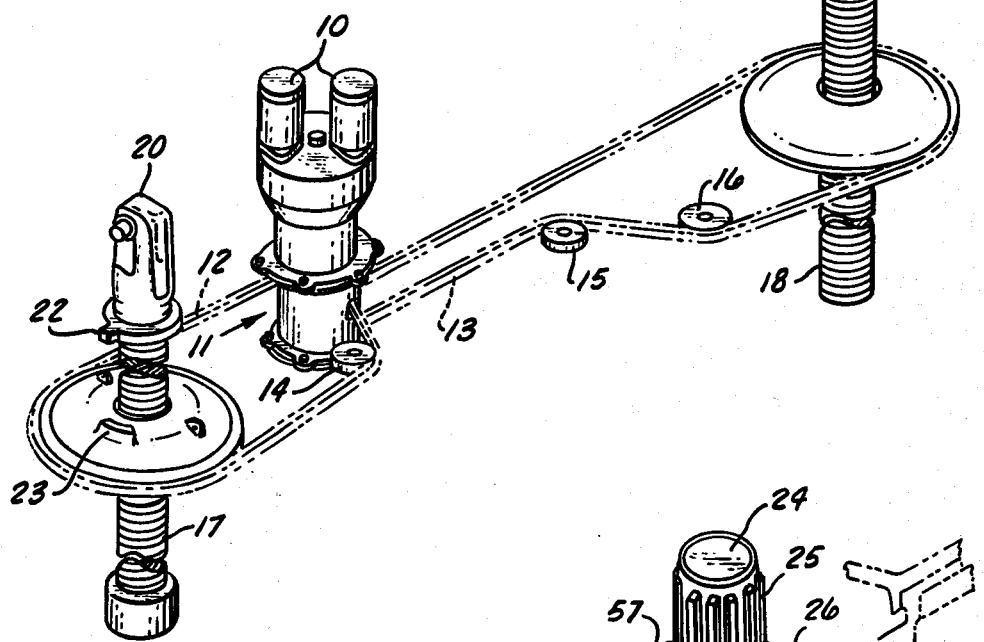
FIG. 2 is a perspective view of the differential drive assembly with the support structures generally shown in phantom lines and partially removed, (including the support bearings) for clarity.
Figure 2:
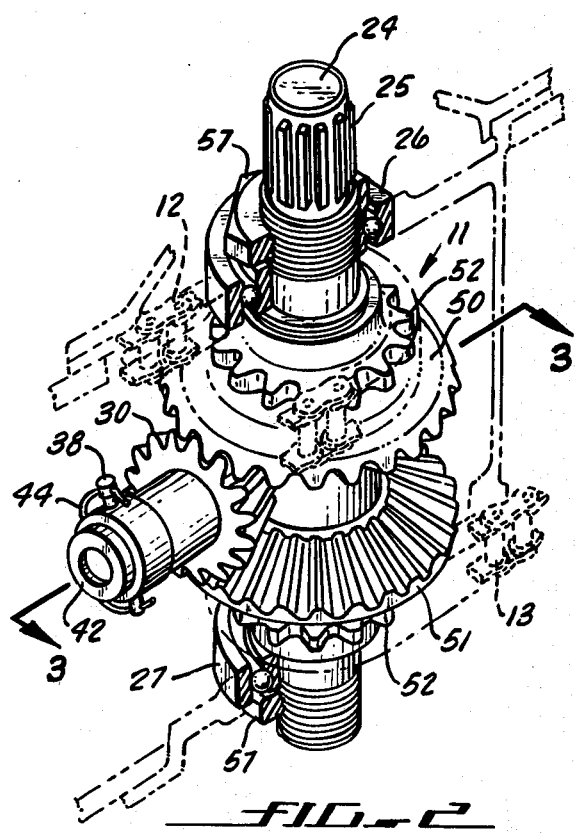

Turning to the detail, FIGS. 2 and 3 show the details of the variable fuse differential drive 11. The drive shaft 24, which is driven by the hydraulic motor 10, via the splines 25, is supported by the bearings 26 and 27. Supporting structure for the bearings is shown in phantom lines. Integrally attached to the drive shaft 24 is the differential pinion shaft 28. Differential pinion gear 30 is supported by the sleeve bearing 31, which engages the differential pinion shaft 28 by mating splines at 32. The splines are indicated by the dotted lines above and below the solid line at 32. The sleeve bearing 31 is retained in place by the nut 33 which is adjusted for clearance at 35 by the shims 34. Torsion shaft 36 connects to the differential pinion shaft 28 via the spline at 37 at one distal end and is connected to the differential pinion gear 30 by the shear pin 38 at the other distal end. Torsion shaft 36 is also spline connected at 40 to the sleeve 41. The cap 42 which is splined to the inside diameter of the shaft portion 45 circumscribes the sleeve 41 to provide a shearing plane at 43 for the shear pin 38 which connects the differential pinion gear 30, the cap 42, and the sleeve 41. The shear pin 38 is suitably safety wired by the wire 44 to prevent the fractured portion of the pin 38 from entering the moving parts. The differential pinion gear 30 is provided with a shaft portion 45 which in conjunction with the torsion shaft 36 provides suitable torsional resilience between the differential pinion shaft 28 and the pinion gear 30. The need for the torsional resilience in this connection will be discussed in detail later. A seal is provided at 46 to keep the bearing surface 47 of the sleeve bearing 31 clean for engagement with the bore 48 of the differential pinion gear 30. These two engaging surfaces, 47 and 48 combine to form a brake which will be discussed in detail infra.

The teeth of the differential pinion gear 30 engage the teeth of the opposing pair of driven bevel gears 50 and 51. Each of the bevel gears, 50 and 51, has an integral chain drive sprocket 52 and is supported by a pair of bearings 53 and 54, separated by a spacer 55. Adjustable shims 56 are provided to accomodate alignment of the two driven bevel gears with the differential pinion gear 30.

The first chain 12 driving the left jackscrew and the second chain 13 driving the right jackscrew are both shown in phantom lines in FIG. 2.

The main support bearings 26 and 27 are retained on the drive shaft 24 by a nut and washer 57 and 58 on either end. These bearings are supported in the aircraft structure shown in phantom in FIG. 2.

In normal operation, the input torque is applied to the drive shaft 24 at the spline 25 by the hydraulic motor 10 and the shaft 24 rotates in its bearings 26 and 27. As a result, the differential pinion shaft 28 carrying the differential pinion gear 30 drives in a circular path about the same axis.

Since the differential pinion gear 30 is pinned to the torsion shaft 36, which in turn is splined to the differential pinion shaft 28, the two bevel gears 50 and 51 must rotate in unison with the differential pinion gear 30 without relative motion between the gears. As can be best seen in the schematic of FIG. 4, the differential pinion gear 30 is working as a balance beam between the two bevel gears 50 and 51. If the loads on the two driven bevel gears 50 and 51 are equal, there is no force tending to rotate the differential pinion gear 30. As the differential load between the two sprockets 52 increases, the force tending to rotate the differential pinion gear 30 increases. Rotation of the differential pinion gear 30 is not only resisted by the shear pin 38, but the sleeve bearing 31 acts as a brake against the bore 48 inside the differential pinion gear 30. The actuator loads are transmitted to the two sprockets 52 which in turn are carried by the driven bevel gears 50 and 51 to the differential pinion 30 and these two forces can be considered to act in summation at the center line of the sleeve bearing 31 represented by the point 60. This force times the coefficient of friction between the sleeve bearing 31 and its mating surface 48 represents a force resisting rotation of the pinion gear 30. Since the normal load acting at 60 is a function of the load on the sprockets 52, the force which resists rotation of the differential pinion gear is a function of the load on the sprockets or the actuators driven thereby. It should now be readily apparent that the brake acts like a variable size pin, i.e. the resisting force is proportional to the load. The critical parameters in sizing the brake are the radius from the centerline of the drive shaft 24 to the centerline of the sleeve bearing 31 represented by the point 60 and the radius of the sleeve bearing 31 along with the coefficient of friction of the sliding surfaces. In the shown embodiment, the brake is sized so that the resisting force is 10 percent of the transmitted load. The sleeve bearing 31 is made of hardened steel and the pinion 30 of soft steel. Sufficient torsional resilience is provided in the torsion shaft 36 and the shaft portion of 45 of the differential pinion gear 30 to insure that the braking force and the sheer force of the fixed pin 38 essentially act in series for a transient differential torque. Thus the brake acts as a damper and prevents inadvertent shearing of pin 38 for torque of a temporary nature. For steady differential torques the brake and pin 38 act in parallel once steady load conditions exist.

In the embodiment shown the fixed pin 38 is sized to shear at 4% of maximum load and the brake at 10%. The combination, of course, can be varied to select the resisting loads required to meet specific requirements.

The invention offers not only the obvious advantage of combining a fixed force with a variable force to resist rotation of the differential pinion gear, but it provides drive force after the fixed pin 38 has failed. This may be a real advantage if the loads causing the failure are for some reason removed. The driven structure (in this case the horizontal stabilizer) must be designed to withstand a worse case division of load forces equal to one half the maximum driving force, plus the braking force, plus the fixed pin shear force acting on one actuator with the balance on the other actuator. In the instant case this represents 50% plus 10% for the variable brake, plus 4% for the fixed pin. This compares with 100% load to one side for a fully dual (parallel-non-differential) drive. A considerable weight saving is effected in the instant case by the reduced loading on the driven horizontal stabilizer surface.

Since the actuator will drive, after the fixed pin fails, a visual indicator is provided to show that the pin 38 has sheared as shown in FIG. 5. An index line 62 is provided on the distal end of the torsion shaft 36 which aligns with a pair of index lines 63 provided on the cap 42 with the shear pin 38 in place. An aperture 64 is provided in the cap 42 so that the index line 62 is visible. Obviously when the index lines are not aligned, the shear pin 38 has failed.

An alternative embodiment of the brake described above utilizes the thrust force component inherent in the bevel gear in conjunction with a multiple disc brake. Another alternative embodiment is to replace the shear pin 38 with a spring loaded detent.

While the preferred embodiment shown and described above is a bevel gear type, any epicyclic gear train of the differential motion type is a suitable alternative embodiment. An epicyclic train of gears may be considered to be a train in which part of the gear axes are moving relative to some one of the axes which is the reference or fixed axis. In the described embodiment, the shaft 24 and the pinion shaft 28 correspond with the arm of the epicyclic spur-gear trains. Further, a differential motion may be considered to be a motion which is the resultant of, or difference between, two original motions.

Also, the embodiment described is of the single pinion gear type. As is very common with epicyclic gear trains of the differential motion type, multiple pinion gears may be employed with each pinion gear having its own shear pin and load proportional self actuating brake. In the multiple pinion gear configuration, the differential load between the driven gears is shared between the multiple pinion gears and the load is considered to be distributed in parallel. Of course after one shear pin fails, the balance of the shear pins will also shear as the load must then be carried by the remaining pinions. However, the multiple pinion arrangement allows each of the load proportional, self-actuating brakes to be smaller. Further, the pinions need not be maintained on pinion axles which are integral with the main drive shaft. The pinions may be supported on an independent means e.g., those typically employed in automobile differentials which use multiple pinion gears.

This invention is not limited to the embodiments disclosed above, but all changes and modifications thereof not constituting deviations from the spirit and scope of this invention are intended to be included.

I claim:

1. In an airplane, an apparatus for the transmission of mechanical power to a first and second driven means which, in turn, drive a single control surface which comprises:
    an epicylic gear train of the differential motion type, said gear train comprising two driven gears and a pinion gear with said pinion gear mounted for rotation on an axle which is attached to an arm which is turning about the axis of at least one of said driven gears;
    means for retaining said pinion gear to said pinion axle so that said pinion gear will rotate on said pinion axle only after a predetermined torque is applied to said pinion gear;
    means for attaching said first and second driven means to one each of said driven gears;
    whereby an input torque applied to said epicyclic gear train causes said arm with said pinion gear to rotate, driving both driven gears without relative movement between the three gears until a predetermined differential torque is experienced between said two driven gears which allows the pinion gear to rotate on its axle.

2. A power transmission apparatus as recited in claim 1, in which said means for retaining said pinion gear to said pinion axle is a shear pin which shears at a predetermined torque.

3. A power transmission apparatus as recited in claim 2, further comprising brake means between said pinion gear and said pinion axle, said brake means being load proportional and self actuating to work in combination with said shear pin.

4. A power transmission apparatus as recited in claim 3, further comprising means for providing torsional resilience between said brake means and said shear pin.

5. A power transmission apparatus as recited in claim 3 wherein said means for attaching said first and second driven means to one each of said two driven gears further comprises:
    first and second sprockets attached to one each of said two driven gears, and
    first and second chains connecting said first and second sprockets with said first and second driven means respectively.

6. A power transmission apparatus as recited in claim 3, further comprising a means for detecting and indicating a failure of said shear pin.

7. In an airplane, an apparatus for the transmission of mechanical power to a first and second driven means which, in turn, drive a single control surface which comprises:
    a drive shaft, supported in bearings for rotation, and having at least one pinion axle oriented 90° to the axis of rotation of said drive shaft;
    a pinion gear mounted on each of said pinion axles;
    a first bevel gear mounted on said drive shaft free to rotate and engaging said pinion gears;
    a second bevel gear mounted on said drive shaft, free to rotate, opposite said first bevel gear with said pinion gears therebetween and engaging said second bevel gear;
    shear pins retaining said pinion gears to said pinion axles;
    brake means between said pinion gear and said pinion axle, said brake means being load proportional and self actuating to work in combination with said shear pin; and
    means for attaching said first and second driven means to said first and second bevel gears respectively;
    whereby a torque applied to the drive shaft causes the attached pinion axles and pinion gears to rotate, driving both bevel gears without relative movement between the gears until a predetermined differential torque is experienced between the two bevel gears which shears the shear pins and slips the brakes retaining the pinion gears which may then rotate on their axles.

8. A power transmission apparatus as recited in claim 7, further comprising means for providing torsional resilience between said brake means and said shear pin.

9. A power transmission apparatus as recited in claim 7 wherein said means for attaching said first and second driven means to one each of said first and second bevel gears further comprises:
    first and second sprockets attached to said first and second bevel gears, and
    first and second chains connecting said first and second sprockets with said first and second driven means, respectively.

10. A power transmission apparatus as recited in claim 7, further comprising a means for detecting and indicating a failure of said shear pin.

11. In an apparatus for the transmission of mechanical power to a first and second driven means, which comprises:
    an epicyclic gear train of the differential motion type, said train comprising two driven gears and a pinion with said pinion gear mounted for rotation on an axle which is attached to an arm which is turning about the axis of at least one of said driven gears;
    a shear pin for retaining said pinion gear to said pinion axle; so that said pinion gear will rotate on said pinion axle only after a predetermined torque is applied to said pinion gear;
    brake means between said pinion gear and said pinion axle, said brake means being load proportional and self actuating to work in combination with said shear pin; and
    means for attaching said first and second driven means to one each of said driven gears.

12. A power transmission apparatus as recited in claim 11, wherein said epicyclic gear train of the differential motion type is of the bevel gear type.

13. A power transmission apparatus as recited in claim 12, further comprising means for providing torsional resilience between said brake means and said shear pin.

14. A power transmission apparatus as recited in claim 12, wherein said means for attaching said first and second driven means to one each of said two driven gears further comprises:
    first and second sprockets attached to one each of said two driven gears, and
    first and second chains connecting said first and second sprockets with said first and second driven means respectively.

15. A power transmission apparatus as recited in claim 12, further comprising a means for detecting and indicating a failure of said shear pin.

* * * * *